US007782968B2

United States Patent
Yu et al.

(10) Patent No.: US 7,782,968 B2
(45) Date of Patent: *Aug. 24, 2010

(54) APPARATUS FOR TRANSMITTING AND RECEIVING DATA TO PROVIDE HIGH-SPEED DATA COMMUNICATION AND METHOD THEREOF

(75) Inventors: Hee-Jung Yu, Daejeon (KR); Taehyun Jeon, Sungnam (KR); Myung-Soon Kim, Daejeon (KR); Eun-Young Choi, Daejeon (KR); Sok-Kyu Lee, Daejeon (KR); Deuk-Su Lyu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/401,293

(22) Filed: Mar. 10, 2009

(65) Prior Publication Data

US 2009/0290654 A1 Nov. 26, 2009

Related U.S. Application Data

(63) Continuation of application No. 11/767,797, filed on Jun. 25, 2007, now Pat. No. 7,535,968.

(51) Int. Cl.
*H04K 1/10* (2006.01)
(52) U.S. Cl. .................... 375/260; 375/267; 375/299; 455/101
(58) Field of Classification Search ............. 375/260, 375/267, 299; 455/101
See application file for complete search history.

(56) References Cited

U.S. PATENT DOCUMENTS 6,950,483 B2 9/2005 Chiodini
7,020,110 B2 3/2006 Walton et al.

(Continued)

FOREIGN PATENT DOCUMENTS

KR 10-2002-0086167 11/2002

(Continued)

OTHER PUBLICATIONS

Jianhua Liu et al., "A MIMO system with backward compatibility for OFDM based WLANs", Signal Processing Advances in Wireless Communications, 2003 (SPAWC 2003), Jun. 15, 2003, pp. 130-134.

(Continued)

*Primary Examiner*—Juan A Torres
(74) *Attorney, Agent, or Firm*—Staas & Halsey LLP

(57) ABSTRACT

In the present invention, data generated from a source unit are distributed to at least one bandwidth; the data distributed to the respective bandwidths are encoded in order to perform an error correction; the encoded data are distributed to at least one antenna; a subcarrier is allocated to the data distributed to the respective antennas, and an inverse Fourier transform is performed; a short preamble and a first long preamble corresponding to the subcarrier are generated; a signal symbol is generated according to a data transmit mode; and a frame is generated by adding a second long preamble between the signal symbol and a data field for the purpose of estimating a channel of a subcarrier which is not used.

9 Claims, 9 Drawing Sheets

U.S. PATENT DOCUMENTS

| | | | |
|---|---|---|---|
| 7,050,768 | B2 | 5/2006 | Hosur et al. |
| 7,352,688 | B1 | 4/2008 | Perahia et al. |
| 7,366,250 | B2 | 4/2008 | Mujtaba et al. |
| 7,382,719 | B2 | 6/2008 | Gummadi et al. |
| 7,415,074 | B2 | 8/2008 | Seto et al. |
| 2002/0160737 | A1 | 10/2002 | Crawford |
| 2003/0072255 | A1 | 4/2003 | Ma et al. |
| 2003/0072452 | A1 | 4/2003 | Mody et al. |
| 2004/0105506 | A1 | 6/2004 | Baek et al. |
| 2005/0054313 | A1 | 3/2005 | Gummadi et al. |
| 2005/0163081 | A1* | 7/2005 | Aoki et al. ............ 370/334 |
| 2005/0233709 | A1 | 10/2005 | Gardner et al. |
| 2005/0276347 | A1 | 12/2005 | Mujtaba et al. |
| 2005/0288062 | A1* | 12/2005 | Hammerschmidt et al. ...... 455/562.1 |
| 2006/0002487 | A1* | 1/2006 | Kriedte et al. ............ 375/267 |

FOREIGN PATENT DOCUMENTS

| | | |
|---|---|---|
| KR | 10-2004-0016672 | 2/2004 |
| KR | 10-2004-0047699 | 6/2004 |
| KR | 10-2004-0062266 | 7/2004 |
| KR | 10-2004-0077279 | 9/2004 |
| KR | 10-2004-0111065 | 12/2004 |
| KR | 10-2004-0077569 | 9/2007 |

OTHER PUBLICATIONS

Eric G Larsson et al., "Preamble Design for Multiple-Antenna OFDM-Based WLANs with Null Subcarriers", IEEE Signal Processing Letters, vol. 8, No. 11, Nov. 1, 2001.

Anonymous ED—Anonymous, "Information technology—telecommunications and information exchange between systems—local and metropolitan area networks—specific requirements / Part 11: Wireless LAN Medium Access Control (MAC) and Physical Layer (PHY) specifications / Amendment 1: high-speed physical layer in the 5 GHz band", IEEE Standard (International Standard ISO/IEC 8802-11:1999/Amd 1:2000(E)), Jan. 1, 2000.

European Search Report dated Oct. 27, 2009 and issued in corresponding European Patent Application 05726596.9.

Liu, "A MIMO system with backward compatibility for OFDM based WLANs", 4$^{th}$ IEEE Workshop on Signal Processing Advances in Wireless Communications, 2003, SPAWC 2003, Jun. 15-18, 2003 pp. 130-134.

IEEE802.11a, "Part 11: Wireless LAN Medium Access Control (MAC) and Physical Layer (PHY) specifications High-speed Physical Layer in the 5 GHz Band", IEEE 1999 pp. 1-45.

Butler, Michael R.G. et al. A Zero-Forcing Approximate Log-Likelihood Receiver for MIMO Bit-Interleaved Coded Modulation. IEEE Communications Letters, vol. 8, No. 2 Feb. 2004.

Yu, Heejung et al. ETRI proposal specification for IEEE 802.11 TGn. Aug. 13, 2004.

International Search Report for PCT/KR2005/000393, mailed Sep. 30, 2005.

Allert van Zelst et al., "Implementation of a MIMO OFDM-Based Wireless LAN System", IEEE Transactions on Signal Processing, vol. 52, No. 2, Feb. 2004, pp. 483-494.

Jaiganesh Balakrishnan et al., "A multi-band OFDM system for UWB communication", IEEE 0-7803-8187-4/03, 2003, pp. 354-358.

Markarian et al., OFDM mode for the IEEE 802.16a PHY draft standard, IEEE May 17, 2001, 59 pages.

\* cited by examiner

APPARATUS FOR TRANSMITTING AND RECEIVING DATA TO PROVIDE HIGH-SPEED DATA COMMUNICATION AND METHOD THEREOF

CROSS-REFERENCE TO RELATED APPLICATIONS

This application is a continuation of U.S. application Ser. No. 11/767,797 filed Jun.25, 2007, now U.S. Pat. No. 7,535,968 and claims priority to International Application PCT/KR2005/000393 filed Feb. 11, 2005 and Korean Application No. 10-2004-0111065, filed on Dec. 23, 2004, the disclosures of all which are hereby incorporated herein by reference.

BACKGROUND OF THE INVENTION

1. Field of the Invention

The present invention relates to an apparatus for transmitting and receiving data in radio data communication. More specifically, the present invention relates to an apparatus compatible with a conventional wireless local area network communication system, for transmitting and receiving data in high-speed and a method thereof. In addition, the present invention relates to a wireless communication system for increasing data rates from 54 Mbps which has been a maximum data rate in the conventional wireless local area network communication system, to hundreds of Mbps.

2. Description of the Related Art

In the conventional IEEE 802.11a wireless local area network (LAN) system using an orthogonal frequency division multiplexing method, a 20 MHz bandwidth is divided into 64 subcarriers, and 52 subcarriers of the 64 subcarriers are used to transmit data and pilot symbols. That is, the data are transmitted at a maximum speed of 54 Mbps by using a single antenna and the 20 MHz bandwidth.

The present invention provides an apparatus for transmitting and receiving data while being compatible with the conventional IEEE 802.11a orthogonal frequency division multiplexing (OFDM) method. The apparatus uses multiple antennas and a plurality of 20 MHz bandwidths to achieve a high data rate.

In response to the demand for high-speed multimedia data transmission, various practical applications requesting more than 100 Mbps throughput have been being developed. However, even the wireless LAN system having the greatest throughput of the current wireless communication systems does not offer over 25 Mbps of throughputs. Therefore the present invention suggests a system offering a data rate which is four times as fast as the conventional IEEE 802.11a system, or more.

In detail, the present invention suggests a configuration in which a number of antennas and bandwidths are systematically controlled and a maximum data rate is controlled according to characteristics of a system. The present invention also suggests a method for providing compatibility with the conventional system.

FIG. 1 shows a block diagram for representing a system for transmitting and receiving data in the conventional wireless LAN.

In the conventional IEEE 802.11a system shown in FIG. 1, 20 MHz bandwidth is divided into 64 subcarriers. Among the 64 subcarriers, 48 subcarriers are used for data transmission 4 subcarriers are used for pilot symbol transmission, and a DC subcarrier and the other 11 subcarriers are not used.

A convolutional code having ½, ⅔, and ¾ code rates, binary phase shift keying (BPSK) modulation, quaternary phase shift keying (QPSK) modulation, 16 quadrature amplitude modulation (QAM) modulation, and 64 quadrature amplitude modulation (QAM) are used to transmit the data.

In the system shown in FIG. 1, when a source unit 101 generates binary data, the binary data are provided to a scrambler 102 for randomizing a permutation of the binary data.

A convolution encoder 103 performs channel encoding according to a code rate and a modulation determined by a desired data rate, and a mapper 105 performs modulation to map the previous data permutation on a complex symbol permutation.

An interleaver 104 provided between the convolution encoder 103 and the mapper 105 interleaves the data permutation according to a predetermined rule. The mapper 105 establishes the complex number permutation to be a group of 48, and a subcarrier allocator 107 forms 48 data components and 4 pilot components from pilot unit 106.

A 64 inverse fast Fourier transform (64-IFFT) unit 108 performs an inverse fast Fourier transform on the 48 data and 4 pilot components to form an OFDM symbol.

A cyclic prefix adder 109 adds a cyclic prefix which is a guard interval to the OFDM symbol.

A radio frequency (RF) transmit unit 110 transmits a transmission frame formed by the above configuration on a carrier frequency. An RF receive unit 112 receives the transmission signal (the transmission frame transmitted on the carrier frequency) through a radio channel 111. The radio channel 111 includes a multi-path fading channel and Gaussian noise added from a receive terminal.

The RF receive unit 112 of the receive terminal receives the distorted signal passing through the radio channel 111, and down-converts the signal transmitted on the carrier frequency to a base band signal in an opposite manner executed by the RF transmit unit 110 of the transmit terminal.

A cyclic prefix eliminator 113 eliminates the cyclic prefix added in a transmitter. A 64 fast Fourier transform (64-FFT) unit 114 converts a received OFDM symbol into a signal of a frequency domain by performing an FFT operation.

A subcarrier extractor 115 transmits the 48 complex symbols corresponding to the data subcarrier among 64 outputs to an equalizing and tracking unit 117, and transmits the 4 subcarriers corresponding to the pilot to an equalizing and tracking parameter estimator 116.

The equalizing and tracking parameter estimator 116 estimates a phase change caused by frequency and time errors by using the known symbols, and transmits an estimation result to the equalizing and tracking unit 117.

The equalizing and tracking unit 117 uses the above estimation result to perform a tracking operation. The equalizing and tracking unit 117 also performs a frequency domain channel equalization operation for equalizing channel distortion in the frequency domain in addition to the tracking process.

A demapper 118 performs a hard decision operation for converting the output complex number after the channel equalizing and tracking operation into the binary data, or performs a soft decision for converting the output complex number into a real number. A deinterleaver 119 deinterleaves the data in an inverse process of the interleaver 104, and a Viterbi decoder 120 performs decoding of the convolution code to correct errors and restore the transmitted data.

A descrambler 121 randomizes the data transmitted from the source unit in a like manner of the scrambler 102 and transmits the received data to a sink unit 122.

The conventional wireless LAN system shown in FIG. 1 has limits of data rate and throughput, and therefore the system is difficult to apply to a service requiring a high data rate such as a high quality moving picture service.

Systems using multiple bandwidths and antennas to provide a high speed data rate have previously not been compatible with the conventional transmitting and receiving system.

Accordingly, the present invention provides an apparatus for transmitting and receiving for providing compatibility with the conventional wireless communication system, and the high speed data rate and a method thereof.

SUMMARY OF THE INVENTION

Technical Problem

The present invention provides a data transmitting and receiving device to provide a high data rate and compatibility with the conventional wireless communication system, and a method thereof.

Technical Solution

The present invention provides a data transmitting and receiving device to provide a high data rate and compatibility with the conventional wireless communication system, and a method thereof.

The present invention discloses a data transmitting device including a bandwidth distributor, an encoder, a mapper, an antenna distributor, a subcarrier allocator, an inverse Fourier transform unit, a preamble generator, and a frame generator.

The bandwidth distributor distributes data generated in a source unit to at least one bandwidth. The encoder performs encoding of the distributed data in order to perform error correction of the data. The mapper performs mapping of the encoded data into a complex number symbol. The antenna distributor distributes the complex number symbol to at least one antenna. The subcarrier allocator allocates a subcarrier for orthogonal frequency division multiplexing to the distributed complex number symbol. The inverse Fourier transform unit performs an inverse Fourier transform of the OFDM signal to which the subcarrier is allocated. The preamble generator generates a short preamble, a first long preamble, and a second long preamble of the subcarrier. The frame generator generates frames in an order of the short preamble, the first long preamble, a signal symbol, the second long preamble, and a data field. At this time, one of the first long preambles of a second antenna may be used for the second long preamble in order to perform a channel estimation of a subcarrier which is not used by a first antenna when two or more antennas are used.

The signal symbol generated by the frame generator comprises a transmit mode identifier for determining whether a transmit mode is a single antenna transmit mode or a multiple-input/multiple-output (MIMO) mode.

The transmit mode identifier uses an R4 bit of the signal symbols in a frame of IEEE 802.11a.

A reserved bit of the signal symbol is used as a bit for determining whether the transmit mode uses a spatial division multiplexing (SDM) method or a space-time block code (STBC) method.

The data transmitting device according to the exemplary embodiment of the present invention further includes a scrambler, an interleaver, a cyclic prefix adder, and an RF transmit unit.

The scrambler is coupled between the bandwidth distributor and the encoder and performs a scrambling operation. The interleaver is coupled between the encoder and the mapper and performs an interleaving operation. The cyclic prefix adder adds a cyclic prefix to an inverse-Fourier-transformed orthogonal frequency division multiplexing (OFDM) signal. The RF transmit unit transmits the frame through a radio channel. The antenna distributor distributes the mapped symbols to antennas or encodes STBC.

The present invention discloses a data receiving device including an RF receiving unit, a channel mixer, an initial synchronizer, a Fourier transforming unit, a signal symbol demodulator, a channel estimator, and a detector.

The RF receiving unit receives a frame through a radio channel. The channel mixer performs a channel mixing operation in order to extract a 20 MHz short preamble and a 20 MHz first long preamble from the received frame. The initial synchronizer performs an initial synchronizing operation by using the extracted short preamble and first long preamble. The Fourier transforming unit performs a Fourier transforming operation of the frame. The signal symbol demodulator demodulates a signal symbol and demodulates information on a transmit mode. The channel estimator performs a first channel estimation by using the first long preamble, and performs a second channel estimation by using a second long preamble transmitting after the signal symbol when the information on the transmit mode is a MIMO-OFDM transmit mode. The detector detects a complex number symbol corresponding to the data with reference to the estimated channel and demodulated signal symbol. We detect a transmit mode identifier established in the signal symbol, and determine whether the transmit mode is a single antenna transmit mode or a MIMO-OFDM transmit mode.

The channel estimator uses the second long preamble to perform the second channel estimation of a subcarrier which is not used by a first antenna.

The data receiving device further includes a cyclic prefix eliminator, a subcarrier extractor, a demapper, a deinterleaver, and an error correction decoder.

The cyclic prefix eliminator eliminates a cyclic prefix of the signal received from the RF receiving unit. The subcarrier extractor extracts subcarriers from the Fourier-transformed signal and combines the subcarriers. The demapper performs demapping of the signal demodulated to the complex number signal into a binary data signal. The deinterleaver performs deinterleaving of the demapped signal. The error correction decoder performs an error correction decoding operation on the deinterleaved signal. The detector is a SDM detector or a STBC decoder.

Advantageous Effect

According to the present invention, an increased data rate is provided by using multiple bandwidths and antennas in a wireless communication system.

Because of compatibility with the conventional system, the increased data rate is provided without modifying the existing device and design.

DETAILED DESCRIPTION OF THE PREFERRED EMBODIMENTS

Figure 1:
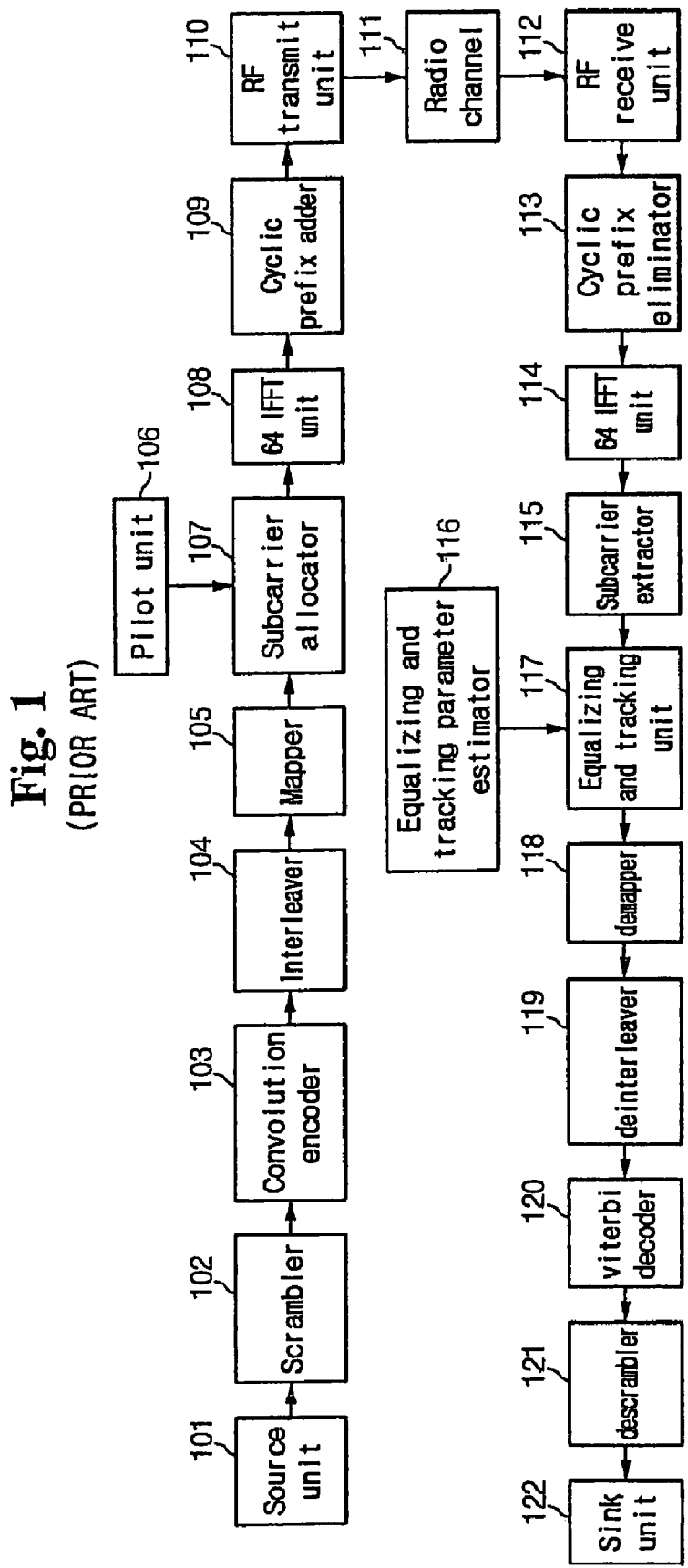
FIG. 1 shows a block diagram for representing a conventional transmitting and receiving system in the wireless LAN.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which same descriptions are provided have the same reference numerals.

While this invention is described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

Figure 2:
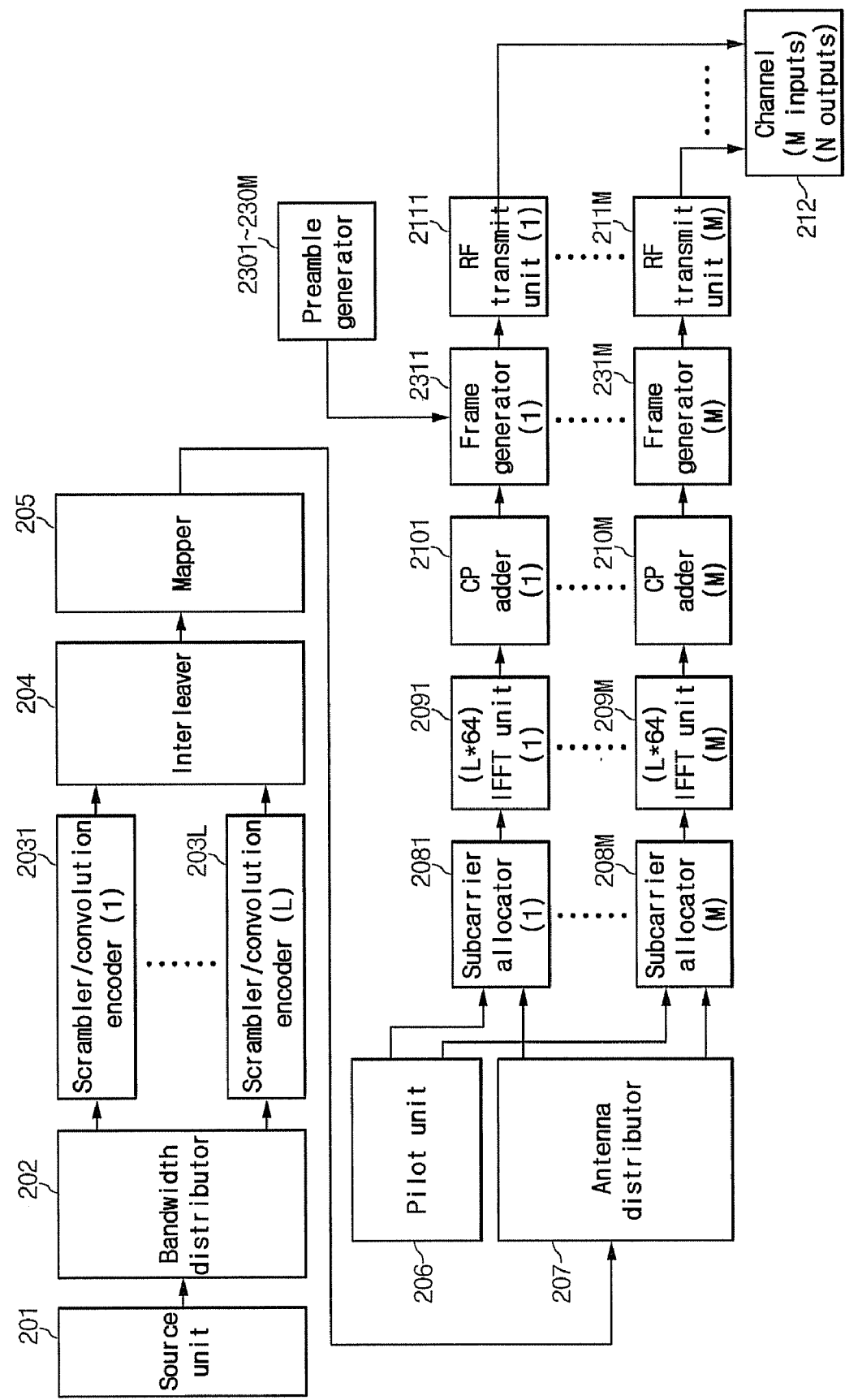
FIG. 2 shows a block diagram for representing a configuration of a transmitter according to an exemplary embodiment of the present invention.

FIG. 2 shows a block diagram for representing a configuration of a transmitter according to an exemplary embodiment of the present invention.

The transmitter includes a source unit 201, a bandwidth distributor 202, scrambler/convolution encoders 2031 to 203L, an interleaver 204, a mapper 205, a pilot unit 206, an antenna distributor 207, subcarrier allocators 2081 to 208M, IFFT units 2091 to 209M, cyclic prefix adders 2101 to 210M, preamble generators 2301 to 230M, frame generators 2311 to 231M, and RF transmit units 2111 to 211M.

When binary data generated in the source unit 201 are transmitted to the bandwidth distributor 202, the bandwidth distributor 202 distributes the binary data to L bandwidths according to a number (L) of 20 MHz bandwidths to be used in the band distributor 202.

The scrambler/convolution encoders 2031 to 203L perform scrambling and convolutional code encoding operations for the respective bandwidths.

The interleaver 204 receives the convolutionally encoded data. At this time, two types of interleavers 204 are available. One interleaver performs interleaving of each OFDM symbol of the respective bandwidths in a like manner of the scrambler/convolution encoders 2031 to 203L, and the other interleaver performs interleaving of the L number of OFDM symbols in every bandwidth. The former interleaver is simple and easy to understand, and the latter interleaver is complex to be realized and it is expected to obtain performance gain due to diversity gain.

The mapper 205 converts the binary data into complex symbols. The converted complex symbols are distributed to M number of transmit antennas by the antenna distributor 207. The subcarrier allocators 2081 to 208M use pilot symbols from the pilot unit 206 and the distributed data complex symbols in order to allocate subcarriers for OFDM modulation. Allocation of the subcarriers will be described later.

Frequency domain OFDM symbols corresponding to the allocated M number of the transmit antennas are inverse-Fourier-transformed into time domain OFDM symbols by the (L*64)-IFFT units 2091 to 209M. The cyclic prefix adders 2101 to 210M add cyclic prefixes corresponding to the OFDM symbols of each path.

The frame generators 2311 to 231M generate proper frames for a system shown in FIG. 2. Similar to the conventional IEEE 802.11a frame configuration, a frame configuration according to an exemplary embodiment of the present invention includes a short preamble, a first long preamble, a signal symbol, and data. In addition, the frame configuration includes a second long preamble in the preamble generators 2301 to 230M. The second long preamble is a long preamble having been used in another antenna, and multiple-input/multiple-output (MIMO) channel estimation on the subcarriers is performed by the second long preamble.

The preamble generators 2301 to 230M generate the short preamble, the first long preamble, and the second long preamble, and provide the same to the frame generators 2311 to 231M.

The frame used in the exemplary embodiment of the present invention will be described later.

Figure 3:
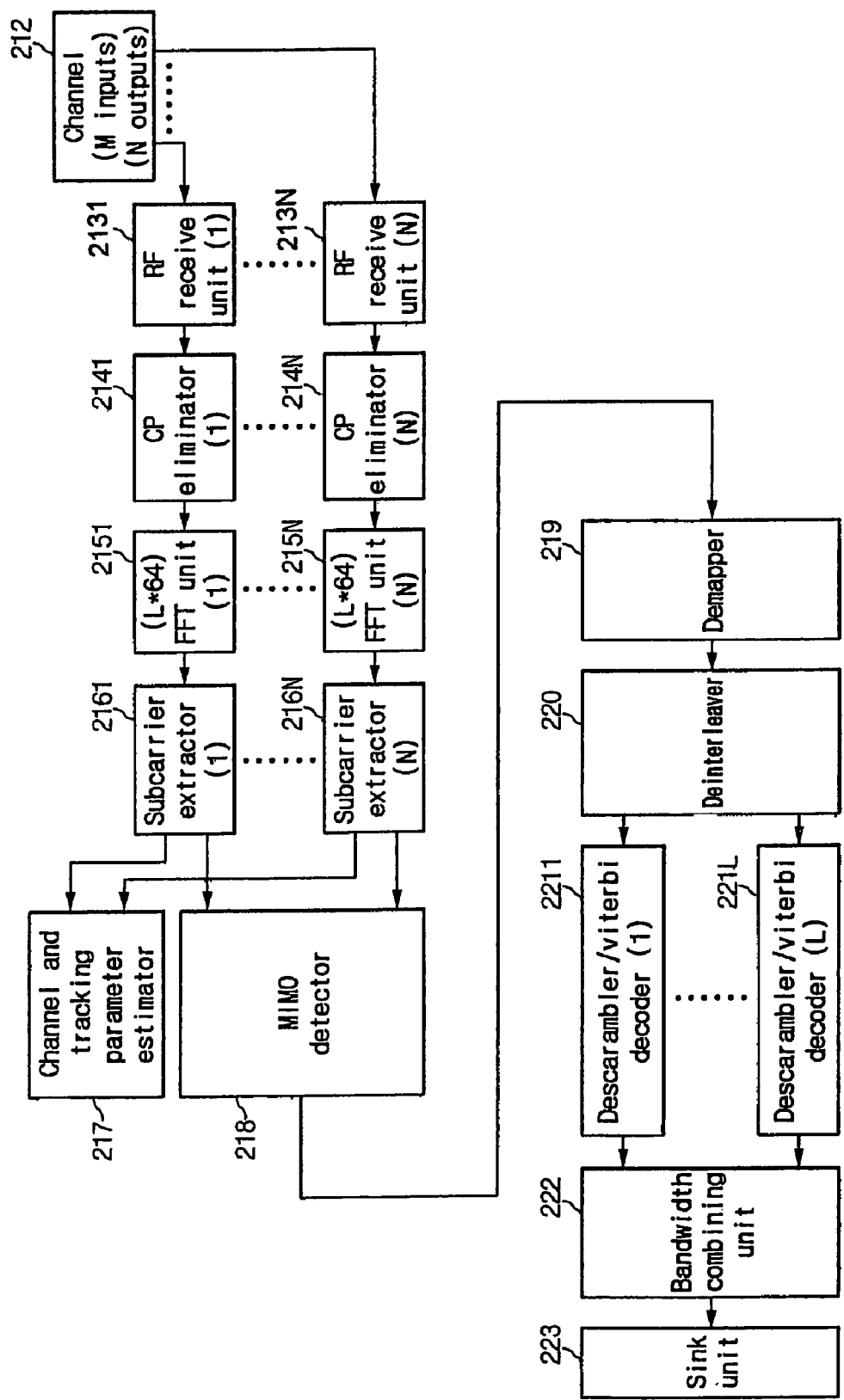
FIG. 3 shows a block diagram for representing a configuration of a receiver according to the exemplary embodiment of the present invention.

FIG. 3 shows a block diagram for representing a receiver according to the exemplary embodiment of the present invention.

The receiver shown in FIG. 3 performs an inverse operation on the signal transmitted from the transmitter shown in FIG. 2.

The signal transmitted through the channel 212 from the transmitter is received by N number of receive antennas in N number of RF receive units 2131 to 213N. The received signal is restored to a transmit signal while passing through cyclic prefix eliminators 2141 to 214N, (L*64) FFT units 2151 to 215N, subcarrier extractors 2161 to 216N, a channel and tracking parameter estimation unit 217, an MIMO detector 218, a demapper 219, a deinterleaver 220, descrambler/Viterbi decoders 2211 to 221L, and a bandwidth combining unit 222, and data are transmitted to a sink unit 223.

A demodulation process of the receiver shown in FIG. 3 is similar to that of the receiver shown in FIG. 1. However, the channel estimation unit 217 in the receiver shown in FIG. 3 estimates the MIMO channel, which is different from the system shown in FIG. 1. In addition, the equalizing unit 117 shown in FIG. 1 is substituted to the MIMO detector 218 in the system shown in FIG. 3. A configuration of the deinterleaver has to be changed according to a varied configuration of the interleaver.

The bandwidth combining unit 222 added in the system shown in FIG. 3 performs an inverse operation of the bandwidth distributor 202 of the transmitter shown in FIG. 2.

While the (L*64) IFFT and (L*64) FFT are used in FIG. 2 and FIG. 3, L number of 64 FFTs and 64 IFFTs may be used, and one (L*64) IFFT and one (L*64) FFT may be also used. These modifications are apparent to those skilled in the art.

FIG. 3 shows a receiving and demodulating configuration in correspondence to the MIMO transmitter shown in FIG. 2, and a configuration of the receiver for performing initial synchronization and channel estimation will be described later.

In FIG. 2, a spatial division multiplexing (SDM) method for increasing the data rate by using the multiple transmit/receive antennas has been described.

The SDM method, one of the MIMO methods, increases the data rate by transmitting independent data via the respective transmit antennas.

When a system is designed for the purpose of broadening a service area and increasing a signal to noise ratio (SNR) rather than for increasing the data rate, a space-time block code (STBC) for achieving the diversity gain may be applied to the exemplary embodiment of the present invention.

When the STBC is applied in the exemplary embodiment of the present invention, the antenna distributor 207 is substituted for an STBC encoder, and the MIMO detector 218 is substituted for an STBC decoder.

For convenience of description, a system including two transmit antennas and two bandwidths will be exemplified to describe the frame configuration of the exemplary embodiment of the present invention. That is, L is 2 and M is 2 in the system shown in FIG. 2. The conventional frame configuration and OFDM symbol configuration are used in the exemplary embodiment of the present invention for the purpose of providing compatibility with the existing IEEE 802.11a system.

As to the OFDM symbol configuration, a 40 MHz bandwidth is divided into 128 subcarriers which are generated by combining two 20 MHz bandwidths each of which is divided into 64 subcarriers in the prior art in the exemplary embodiment of the present invention. Accordingly, 128-IFFT is used to perform the OFDM modulation in 20 MHZ and 40 MHz bandwidths.

Figure 4:
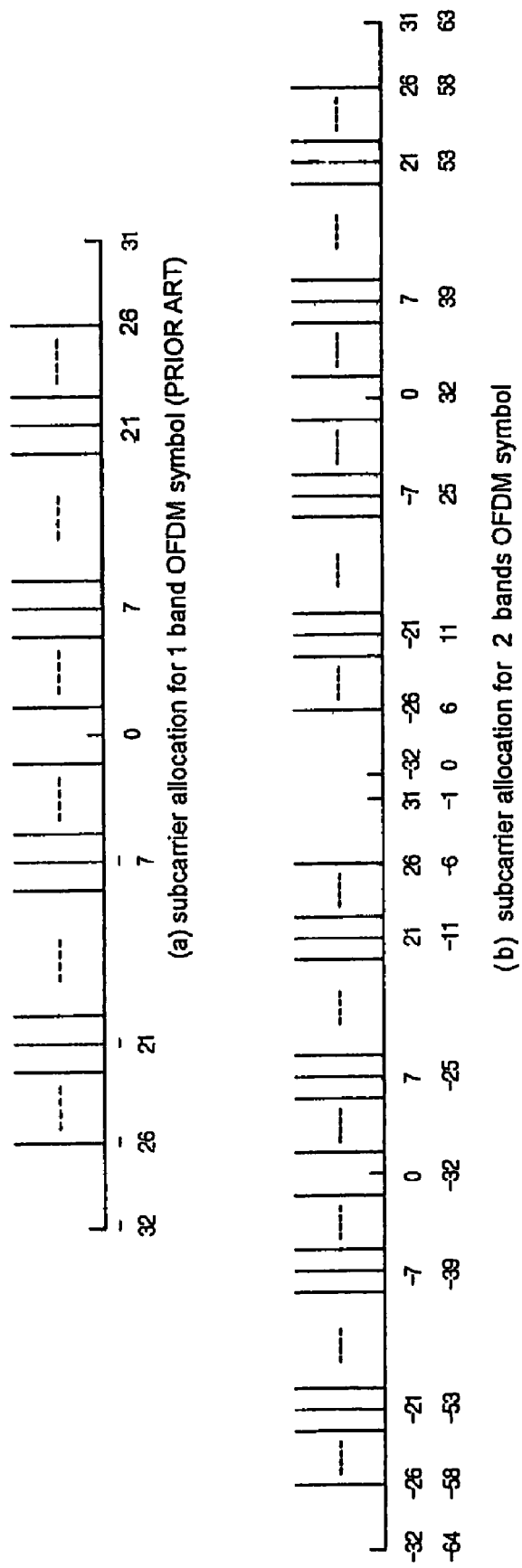
FIG. 4 shows an OFDM subcarrier allocation method supporting a single bandwidth and an OFDM subcarrier allocation method for supporting multiplex bandwidths.

FIG. 4 shows an OFDM subcarrier allocation method supporting a single bandwidth and an OFDM subcarrier allocation method for supporting multiplex bandwidths.

A subcarrier allocation configuration (a) is formed when a signal is transmitted by a single antenna and a single bandwidth in the conventional IEEE 802.11a. The configuration (b) according to the exemplary embodiment of the present invention corresponds to that of the conventional IEEE 802.11a when a signal fills a desired bandwidth, 0 fills other bandwidths, and the signal is transmitted through the single antenna.

That is, the data and pilot are allocated in 52 subcarriers between 0 and 63, and 0's are filled between −64 and −1 when one side bandwidth having a lower frequency is used in a signal configuration (b) using the two bandwidths of the subcarrier allocation configuration shown in FIG. 4. Accordingly, the system according to the exemplary embodiment of the present invention is compatible with the conventional IEEE 802.11a system because the conventional frame configuration is transmitted in the new system.

The frame configuration according to the exemplary embodiment of the present invention will be described.

Figure 5:
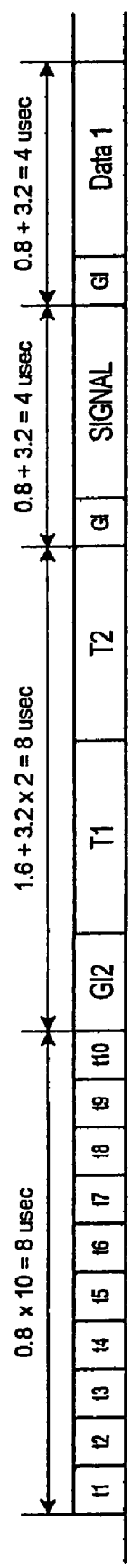
FIG. 5 shows a diagram for representing the IEEE 802.11a frame configuration.

FIG. 5 shows a diagram for representing the IEEE 802.11a frame configuration. The IEEE 802.11a frame configuration shown in FIG. 5 includes short preambles t1 to t10, long preambles T1 and T2, guard intervals G1 and G2, a signal symbol SIGNAL, and data. The short preamble and the long preamble are symbols for synchronization and channel estimation in a case of demodulation. The signal symbol includes information on data rate, length, and parity.

The short preamble is a symbol generated by Fourier-transforming an OFDM frequency domain signal as given in Math Formula 1, and the long preamble is a symbol generated by Fourier-transforming an OFDM frequency domain signal as given in Math Formula 2.

$$S_{-26,26} = \sqrt{(13/6)} \cdot \{0, 0, 1+j, 0, 0, 0, -1-j, 0, 0, 0, 1+j,$$
$$0, 0, 0, -1-j, 0, 0, 0, -1-j, 0, 0, 0, 1+j,$$
$$0, 0, 0, 0, 0, 0, 0, -1-j, 0, 0, 0, -1-j, 0,$$
$$0, 0, -1-j, 0, 0, 0, -1-j, 0, 0, 0, 1+j, 0,$$
$$0, 0, 1+j, 0, 0, 0, 1+j, 0, 0, 0, 1+j, 0, 0\}$$
[Math Formula 1]

$$L_{-26,26} = \{1, 1, -1, -1, 1, 1, -1, 1, -1, 1, 1, 1,$$
$$1, 1, 1, -1, -1, 1, 1, -1, 1, -1, 1, 1, 1, 1,$$
$$0, 1, -1, -1, 1, 1, -1, 1, -1, 1, -1, -1, -1,$$
$$-1, -1, 1, 1, -1, -1, 1, -1, 1, -1, 1, 1, 1, 1\}$$
[Math Formula 2]

The signal symbol includes information on length of data sections (0 to 4,095 bytes), code rates (½, ⅔, and ¾), and mapping methods (BPSK, QPSK, 16-QAM, and 64-QAM).

For the purpose of providing compatibility with the IEEE 802.11a, frame configuration shown in FIG. 5 is slightly modified for the characteristics of the multiple antennas when signals are transmitted according to the conventional OFDM mode (IEEE 802.11a) in the exemplary embodiment of the present invention.

When two transmit antennas are used, 52 subcarriers of preambles are equally divided by 26 subcarriers to be transmitted. A second long preamble is further provided after the signal symbol in order to estimate the channel of the subcarrier which is not used in the first long preamble.

The MIMO channel estimation of the subcarriers is performed by transmitting the first long preamble used as the second long preamble by another antenna. Accordingly, the length of the long preamble is increased by the number of the transmit antennas.

A frequency domain signal of the short preamble to the two antennas is given by Math Formula 3. S(0)-26,26 is transmitted by the antenna 0, and S(1)-26,26 is transmitted by the antenna 1.

A frequency domain signal of the first long preamble provided before the signal symbol is given by Math Formula 4. L(0)-26,26 is transmitted by the antenna 0, and L(1)-26,26 is transmitted by the antenna 1.

$$S^{(0)}_{-26,26} = \sqrt{(26/6)} \cdot \{0, 0, 1+j, 0, 0, 0, 0, 0, 0, 0, 1+j,$$
$$0, 0, 0, 0, 0, 0, 0, -1-j, 0, 0, 0, 0, 0, 0, 0,$$
$$0, 0, 0, 0, -1-j, 0, 0, 0, 0, 0, 0, 0, 1+j,$$
$$0, 0, 0, 0, 0, 0, 0, 1+j, 0, 0, 0, 0, 0, 0\}$$
$$S^{(1)}_{-26,26} = \sqrt{(26/6)} \cdot \{0, 0, 0, 0, 0, 0, -1-j, 0, 0,$$
$$0, 0, 0, 0, 0, -1-j, 0, 0, 0, 0, 0, 0, 0, 1+j,$$
$$0, 0, 0, 0, 0, 0, 0, 0, 0, 0, -1-j, 0, 0, 0,$$
$$0, 0, 0, 0, 1+j, 0, 0, 0, 0, 0, 0, 0, 1+j, 0, 0\}$$
[Math Formula 3]

$$L^{(0)}_{-26,26} = \sqrt{2} \cdot \{1, 0, -1, 0, 1, 0, -1, 0, -1, 0, 1, 0, 1, 0,$$
$$1, 0, -1, 0, 1, 0, 1, 0, 1, 0, 1, 0, 0, 0, 0, -1,$$
$$0, 1, 0, -1, 0, -1, 0, -1, 0, -1,$$
$$0, 1, 0, -1, 0, -1, 0, -1, 0, 1, 0, 1\}$$
$$L^{(1)}_{-26,26} = \sqrt{2} \cdot \{0, 1, 0, -1, 0, 1, 0, 1, 0, 1, 0,$$
$$1, 0, 1, 0, -1, 0, 1, 0, -1, 0, -1, 0, 1, 0,$$
$$1, 0, 1, 0, -1, 0, 1, 0, 1, 0, 1, 0, -1, 0,$$
$$-1, 0, 1, 0, -1, 0, 1, 0, 1, 0, 1, 0, 1, 0\}$$
[Math Formula 4]

In a case of the second long preamble following the signal symbol, a location of the first long preamble is changed so that L(1)–26,26 is transmitted by the antenna 0 and L(0)–26, 26 is transmitted by the antenna 1.

Figure 6:
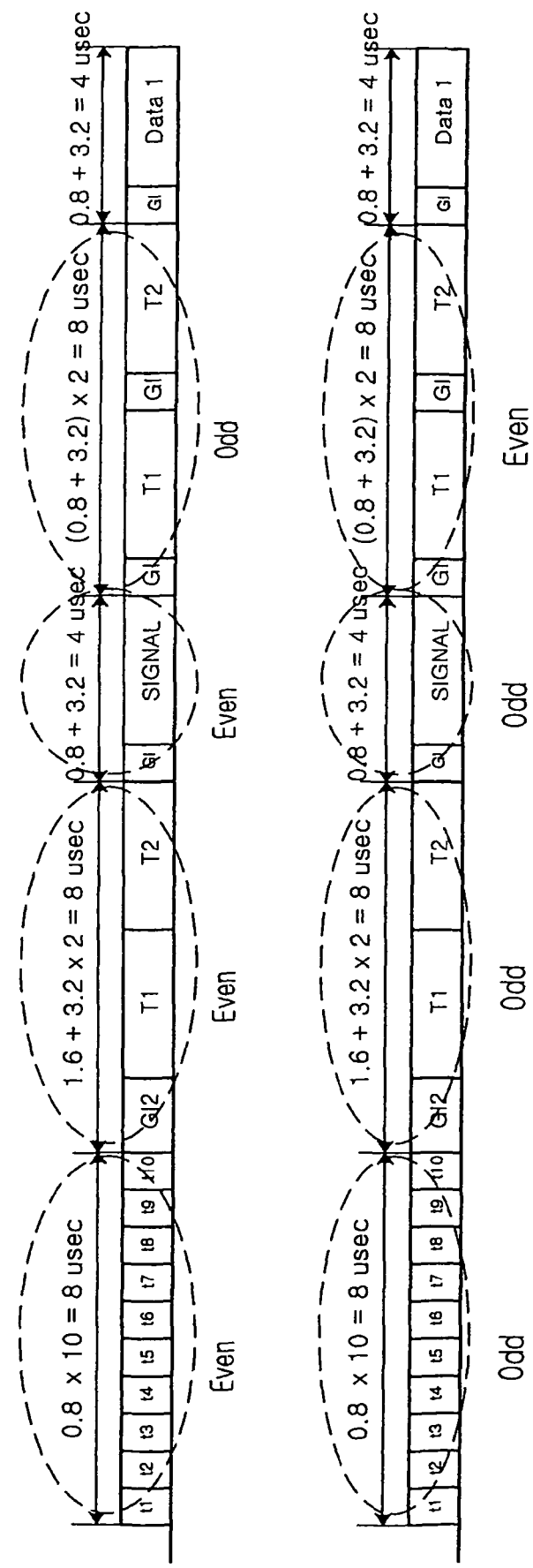
FIG. 6 shows a diagram for representing the frame configuration according to an exemplary embodiment of the present invention.

FIG. 6 shows a diagram for representing the frame configuration according to an exemplary embodiment of the present invention.

As shown in FIG. 6, the frame transmitted by the first antenna (antenna 0) uses the even subcarriers to transmit the frame, and the frame is formed by using the first long preamble of the odd subcarriers as the second long preamble.

The configuration of the preamble and the signal symbol are repeatedly connected to support multiple bandwidths. For example, the short preamble and long preamble for the conventional mode (dual band IEEE 802.11a) using two bandwidths are represented by Math Formula 5 and Math Formula 6 when the two bandwidths are used.

$$S_{-58,58} = \quad \text{[Math Formula 5]}$$
$$\sqrt{(13/6)} \cdot \{0, 0, 1+j, 0, 0, 0, -1-j, 0, 0, 0, 1+j,$$
$$0, 0, 0, -1-j, 0, 0, 0, -1-j, 0, 0, 0, 1+j,$$
$$0, 0, 0, 0, 0, 0, -1-j, 0, 0, 0, -1-j, 0,$$
$$0, 0, 1+j, 0, 0, 0, 1+j, 0, 0, 0, 1+j, 0, 0,$$
$$0, 1+j, 0, 0, 0, 0, 0, 0, 0, 0, 0, 0, 0, 0, 0,$$
$$0, 1+j, 0, 0, 0, -1-j, 0, 0, 0, 1+j, 0, 0, 0,$$
$$-1-j, 0, 0, 0, -1-j, 0, 0, 0, 1+j, 0, 0, 0, 0,$$
$$0, 0, 0, -1-j, 0, 0, 0, -1-j, 0, 0, 0, 1+j,$$
$$0, 0, 0, 1+j, 0, 0, 0, 1+j, 0, 0, 0, 1+j, 0, 0\}$$

$$L_{-58,58} = \{1, 1, -1, -1, 1, 1, -1, 1, -1, 1, 1, 1, 1, 1, \quad \text{[Math Formula 6]}$$
$$1, -1, -1, 1, 1, -1, 1, -1, 1, 1, 1, 1, 0, 1, -1,$$
$$-1, 1, 1, -1, 1, -1, 1, -1, -1, -1, -1, -1, 1,$$
$$1, -1, -1, 1, -1, 1, -1, 1, 1, 1, 1, 0, 0, 0, 0, 0,$$
$$0, 0, 0, 0, 0, 0, 1, 1, -1, -1, 1, 1, -1, 1, -1, 1,$$
$$1, 1, 1, 1, 1, -1, -1, 1, 1, -1, 1, -1, 1, 1, 1, 1,$$
$$1, 0, 1, -1, -1, 1, 1, -1, 1, -1, 1, -1, -1, -1,$$
$$-1, -1, 1, 1, -1, -1, 1, -1, 1, -1, 1, 1, 1, 1\}$$

When the two bandwidths and two antennas are used, the short preamble and the long preamble transmitted by the respective antennas are given by Math Formula 7 and Math Formula 8.

$$S^{(0)}_{-58,58} = \quad \text{[Math Formula 7]}$$
$$\sqrt{(26/6)} \cdot \{0, 0, 1+j, 0, 0, 0, 0, 0, 0, 0, 1+j, 0,$$
$$0, 0, 0, 0, 0, -1-j, 0, 0, 0, 0, 0, 0, 0,$$
$$0, 0, 0, -1-j, 0, 0, 0, 0, 0, 0, 0, 1+j, 0, 0,$$
$$0, 0, 0, 0, 0, 1+j, 0, 0, 0, 0, 0, 0, 0, 0, 0,$$
$$0, 0, 0, 0, 0, 0, 0, 0, 1+j, 0, 0, 0, 0, 0, 0,$$
$$0, 1+j, 0, 0, 0, 0, 0, 0, 0, -1-j, 0, 0, 0, 0,$$
$$0, 0, 0, 0, 0, 0, 0, -1-j, 0, 0, 0, 0, 0, 0, 0,$$
$$1+j, 0, 0, 0, 0, 0, 0, 0, 1+j, 0, 0, 0, 0, 0, 0\}$$
$$S^{(1)}_{-58,58} = \sqrt{(26/6)} \cdot \{0, 0, 0, 0, 0, 0, -1-j, 0, 0, 0,$$
$$0, 0, 0, -1-j, 0, 0, 0, 0, 0, 0, 0, 1+j, 0, 0, 0,$$
$$0, 0, 0, 0, 0, 0, 0, -1-j, 0, 0, 0, 0, 0, 0, 0,$$
$$0, 1+j, 0, 0, 0, 0, 0, 0, 0, 1+j, 0, 0, 0, 0, 0, 0,$$
$$0, 0, 0, 0, 0, 0, 0, 0, 0, 0, 0, 0, 0, -1-j, 0,$$
$$0, 0, 0, 0, 0, -1-j, 0, 0, 0, 0, 0, 0, 0, 1+j,$$
$$0, 0, 0, 0, 0, 0, 0, 0, 0, 0, -1-j, 0, 0, 0, 0,$$
$$0, 0, 0, 1+j, 0, 0, 0, 0, 0, 0, 0, 1+j, 0, 0\}$$

-continued $$L^{(0)}_{-58,58} = \quad \text{[Math Formula 8]}$$
$$\sqrt{2} \cdot \{1, 0, -1, 0, 1, 0, -1, 0, 1, 0, 1, 0, 1, 0, -1, 0,$$
$$1, 0, 1, 0, 1, 0, 1, 0, 0, 0, -1, 0, 1, 0, -1, 0, -1,$$
$$0, -1, 0, -1, 0, -1, 0, 1, 0, -1, 0, -1, 0, -1, 0,$$
$$1, 0, 1, 0, 0, 0, 0, 0, 0, 0, 0, 0, 0, 1, 0, -1, 0, 1,$$
$$0, -1, 0, -1, 0, 1, 0, 1, 0, 1, 0, -1, 0, 1, 0, 1, 0,$$
$$1, 0, 1, 0, 0, 0, -1, 0, 1, 0, -1, 0, -1, 0, -1, 0,$$
$$-1, 0, -1, 0, 1, 0, -1, 0, -1, 0, -1, 0, 1, 0, 1\}$$
$$L^{(1)}_{-58,58} = \sqrt{2} \cdot \{0, 1, 0, -1, 0, 1, 0, 1, 0, 1, 0, 1, 0, 1,$$
$$0, -1, 0, 1, 0, -1, 0, -1, 0, 1, 0, 1, 0, 1, 0, -1,$$
$$0, 1, 0, 1, 0, 1, 0, -1, 0, -1, 0, 1, 0, -1, 0, 1, 0,$$
$$1, 0, 1, 0, 1, 0, 0, 0, 0, 0, 0, 0, 0, 0, 0, 0, 1, 0,$$
$$-1, 0, 1, 0, 1, 0, 1, 0, 1, 0, 1, 0, -1, 0, 1, 0, -1,$$
$$0, -1, 0, 1, 0, 1, 0, 1, 0, -1, 0, 1, 0,$$
$$-1, 0, -1, 0, 1, 0, -1, 0, 1, 0, 1, 0, 1, 0\}$$

As described above, S(0)–58,58 is transmitted by the antenna 0 and S(1)–58,58 is transmitted by the antenna 1. L(0)–58,58 is transmitted by the antenna 0, and L(1)–58,58 is transmitted by the antenna 1. However, the second long preamble following the signal symbol is transmitted in an inverse order.

According to the above-described configuration, the receive terminal performs the channel estimation of the subcarriers by further performing the channel estimation using the second long preamble without determining which antenna transmits the signal in the system using the multiple bandwidths and the multiple antennas.

Accordingly, the long preamble is generated in the like manner of generating the long preamble by the preamble generators 2301 to 230M shown in FIG. 2, and the preamble generators 2301 to 230M additionally inserts the second long preamble after the signal symbol to generate the frame.

The frame generator modifies the signal symbol in order to provide compatibility with the conventional system.

A bit which has not been used as a reserved bit in the conventional symbol configuration is redefined as an antenna bit A, and the bit is used for discerning between the SDM and the STBC.

An R4 bit of four RATE bits is used for distinguishing between the conventional IEEE 802.11a mode and the multiple antenna OFDM mode. Accordingly, the frame generator allocates the RATE bits R1 to R4 and the antenna bit A as shown in Table 1.

TABLE 1

| RATE, ANTENNA bit allocation, (R1-R4, A), | Data rate, | Mapping method, | Code rate, | Transmit mode, |
|---|---|---|---|---|
| 1101X, | 6, | BPSK, | 1/2, | IEEE802 11a, |
| 1111X, | 9, | BPSK, | 3/4, | IEEE802 11a, |
| 0101X, | 12, | QPSK, | 1/2, | IEEE802 11a, |
| 0111X, | 18, | QPSK, | 3/4, | IEEE802 11a, |
| 1001X, | 24, | 16QAM, | 1/2, | IEEE802 11a, |
| 1011X, | 36, | 16QAM, | 3/4, | IEEE802 11a, |
| 0001X, | 48, | 64QAM, | 2/3, | IEEE802 11a, |
| 0011X, | 54, | 64QAM, | 3/4, | IEEE802 11a, |
| 11000, | 6, | BPSK, | 1/2, | STBC-OFDM, |
| 11100, | 9, | BPSK, | 3/4, | STBC-OFDM, |
| 01000, | 12, | QPSK, | 1/2, | STBC-OFDM, |
| 01100, | 18, | QPSK, | 3/4, | STBC-OFDM, |
| 10000, | 24, | 16QAM, | 1/2, | STBC-OFDM, |
| 10100, | 36, | 16QAM, | 3/4, | STBC-OFDM, |
| 00000, | 48, | 64QAM, | 2/3, | STBC-OFDM, |

TABLE 1-continued

| RATE, ANTENNA bit allocation, (R1-R4, A) | Data rate | Mapping method | Code rate | Transmit mode |
|---|---|---|---|---|
| 00100 | 54 | 64QAM | 3/4 | STBC-OFDM |
| 11001 | 12 | BPSK | 1/2 | SDM-OFDM |
| 11101 | 18 | BPSK | 3/4 | SDM-OFDM |
| 01001 | 24 | QPSK | 1/2 | SDM-OFDM |
| 01101 | 36 | QPSK | 3/4 | SDM-OFDM |
| 10001 | 48 | 16QAM | 1/2 | SDM-OFDM |
| 10101 | 72 | 16QAM | 3/4 | SDM-OFDM |
| 00001 | 96 | 64QAM | 2/3 | SDM-OFDM |
| 00101 | 108 | 64QAM | 3/4 | SDM-OFDM |

As shown in Table 1, when the R4 bit is established to be 1 the data is received in the IEEE 802.11a method. Because the transmission mode is the IEEE 802.11a mode when the R4 bit is 1, a value of the antenna bit A has no effect, and the configuration of the signal symbol corresponds to that of the IEEE 802.11a.

However, when the R4 bit is established to be 0, the system is the MIMO system. At this time, it is determined whether the transmit mode is the SDM mode or the STBC mode with reference to the antenna bit A.

The R1 to R3 bits respectively correspond to information on eight data rates, mapping methods, and code rates.

Accordingly, the signal symbol is configured by combining 24 bits in a like manner of the conventional signal symbol. The 24 bits include length of 12 bits, parity of 1 bit, and tail of 6 bits. The data is transmitted on the 64 or repeated 128 (64+64) subcarriers in the conventional IEEE 802.11a mode, and the data is separately transmitted on the even subcarriers and the odd subcarriers in the multiple antenna mode as shown in Math FIG. 4 and Math FIG. 8.

In terms of the output of the transmit antenna, predetermined preamble and signal symbol configurations are formed regardless of the number of the transmit antennas and bandwidths.

In the above frame configuration, a process for maintaining the compatibility by the conventional system and the system according to the exemplary embodiment in the receive terminal will be described.

When the data is transmitted in the conventional IEEE 802.11a system, the conventional receiver may perform a demodulation of the short preamble, the first long preamble, and the signal symbol field. However, when the signal symbol is interpreted, the data following the signal symbol is demodulated because the frame corresponds to the conventional frame when the R4 bit of the RATE bits is 1, the data demodulation is not performed until the frame ends because the frame is not demodulated by the conventional demodulator when the R4 bit is 0. Accordingly, the compatibility is provided in a network formed by combing the conventional system and the system according to the exemplary embodiment of the present invention.

The receiver of the system according to the exemplary embodiment of the present invention starts to perform demodulating of the data following the signal symbol after the receiver acknowledges that the frame is the IEEE 802.11a frame when R4 of the signal symbols is 1. When the R4 is 0, however, the receiver performs the channel estimation by using the second long preamble following the signal symbol, searches the antenna bit A, determines whether the transmit mode is the SDM-OFDM or the STBC-OFDM, and restores the transmit data after a proper demodulation process according to the determined mode.

Accordingly, the system according to the exemplary embodiment of the present invention is allowed to be compatible with the conventional IEEE 802.11a system.

Figure 7:
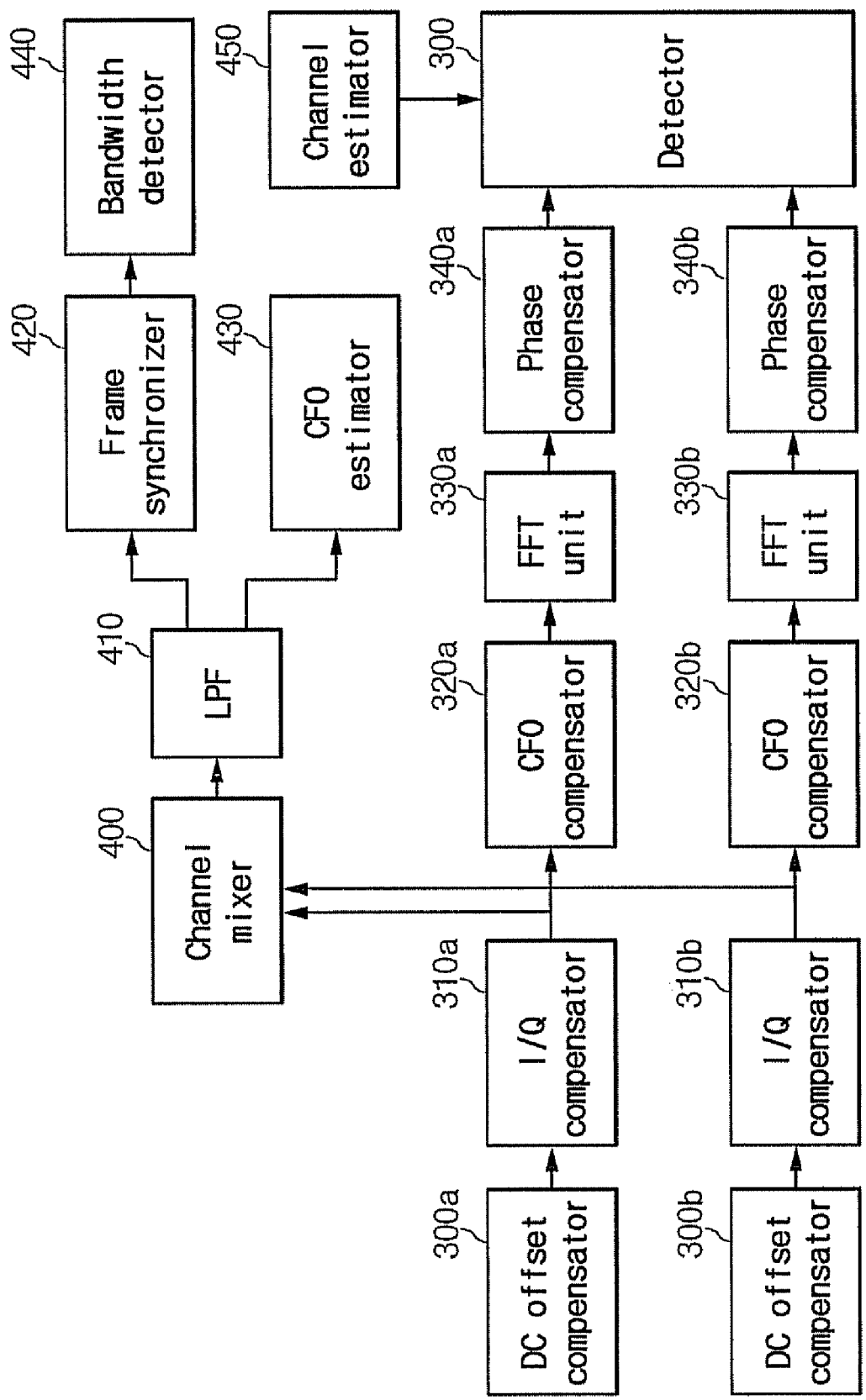
FIG. 7 shows a block diagram for representing a configuration for initial synchronization of the receiver according to an exemplary embodiment of the present invention.

FIG. 7 shows a block diagram for representing a configuration for an initial synchronization of the receiver according to the exemplary embodiment of the present invention.

In FIG. 7, the receiver includes DC-offset compensators 300a and 300b, and inphase and quadrature (I/Q) compensators 310a and 310b for compensating I/Q mismatch, for a path of the respective antennas. The DC-offset compensators 300a and 300b eliminate a DC-offset on the path of the respective antennas which may be generated in an analog and RF circuits. The I/Q compensators 310a and 310b compensate the I/Q mismatch which may be generated in the analog and RF circuits.

The data before the signal symbol, which are the short preamble part and the first long preamble part, is input to a channel mixer 400. In the channel mixer 400, the frequency is shifted by +10 MHz and by −10 MHz in order to respectively divide two bandwidth 40 MHz signals into channel 0 of 20 MHZ and channel 1 of 20 MHz. Accordingly, two outputs are generated from the respective antenna paths. The signals pass through a low pass filter (LPF) 410 and the signals are decimated by ½ in order to convert the signals to 20 MHz bandwidth signals. The initial synchronization is performed by using the short preamble and first long preamble of 20 MHz.

A carrier frequency offset (CFO) estimator 430 estimates a carrier frequency offset by using an auto-correlation of the short preamble and the first long preamble. A carrier offset (CFO) compensator 320a, 320b compensates the carrier frequency offset based on the estimated value output from the CFO estimator 430.

A frame synchronizer 420 performs frame synchronization by using a cross correlation of the short preamble and the first long preamble. A bandwidth detector 440 performs bandwidth detection for determining the operational bandwidth by using the auto correlation of the first long preamble.

The signal symbol including the first long preamble and the data part are input to FFT units 330a and 330b after the initial synchronization is performed. At this time, the channel is estimated and the signal symbol is demodulated by using an FFT output of the first long preamble.

The signal symbol is demodulated without having information on the transmit mode because a method for transmitting the signal symbol is always the same. After the signal symbol is demodulated, the information on the transmit mode, operational bandwidth, frame length, demodulation method, and code rate is provided.

As described above, when the R4 is 1 (that is, when the transmit mode is the MIMO-OFDM mode), a channel estimator 450 further performs the channel estimation by using the second long preamble.

The data field is demodulated with reference to the information established in the signal symbol when the channel estimation is performed.

Phase compensators 340a and 340b estimate and compensate residual frequency and phase offsets by using the pilot subcarrier.

The signal is detected according to the transmit mode by the detector 300, and the receiver combines the data passed through the demapper, the deinterleaver, the Viterbi decoder, and the descrambler and transmits the combined data to a media access control (MAC) layer.

Therefore, the system supporting the multiple antennas facilitates the channel estimation and provides the compatibility with the conventional system.

Figure 8:
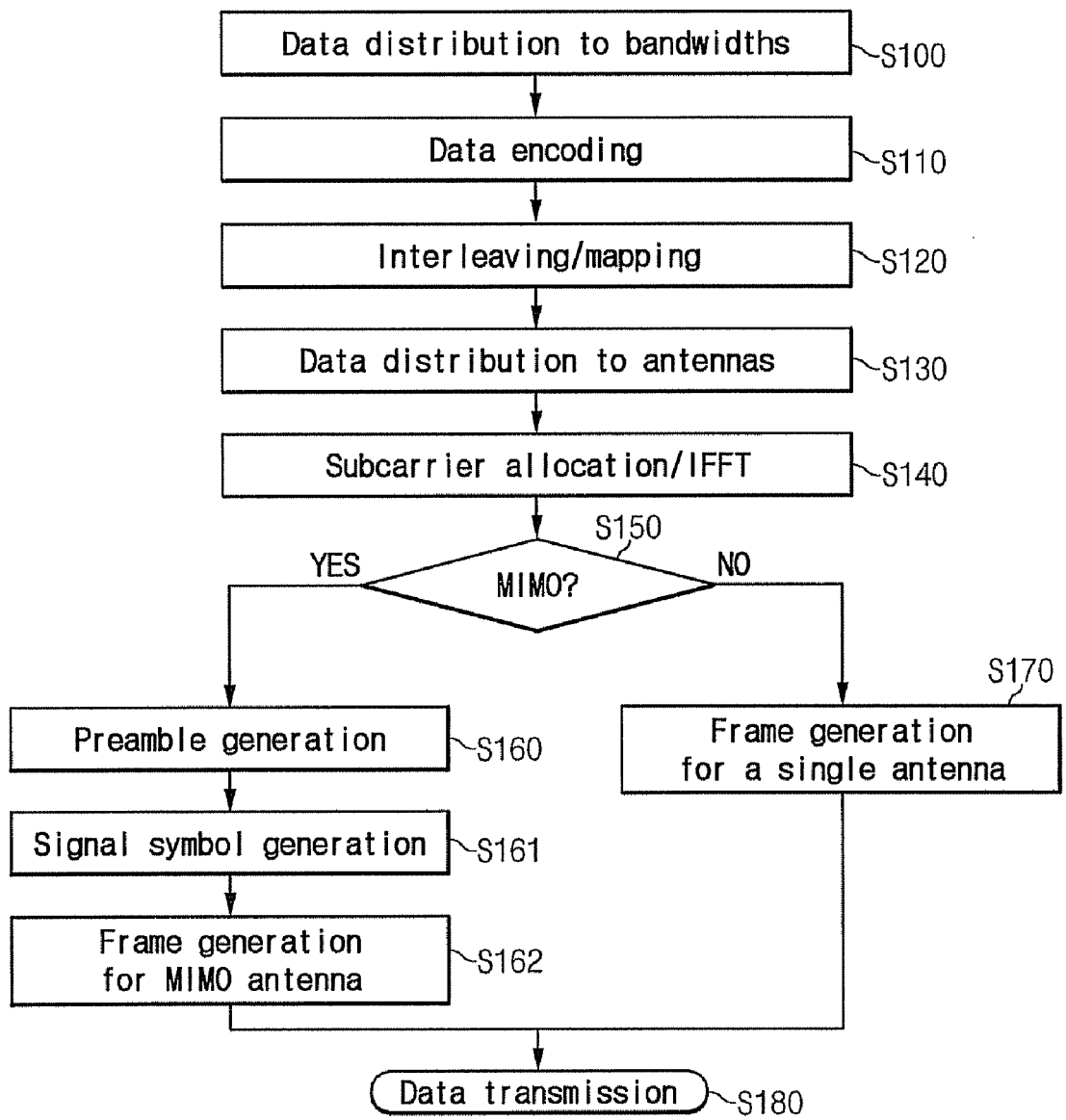
FIG. 8 shows a flow chart for representing a method for transmitting the data according to an exemplary embodiment of the present invention.

FIG. 8 shows a flow chart for representing a method for transmitting the data according to an exemplary embodiment of the present invention.

The binary data generated in the source unit are distributed to the plurality of bandwidths in step S100. The data rate may be increased as the binary data are distributed to the plurality of bandwidths.

The data distributed to the respective bandwidths are respectively encoded in step S110 by exemplarily using the convolution code for increasing error correction of data. The scrambling operation may be further performed before the encoding operation.

The interleaving operation for preventing a burst transmit error is performed, and the binary data are mapped into a plurality of complex symbols in step S120 when the data are encoded. The mapping method includes the BPSK, QPSK, 16QAM, and 64QAM modulations.

The data mapped into the complex number symbols are distributed to the antennas, and the subcarriers allocated to the respective antennas are allocated to the distributed complex symbols in step S140. The OFDM signals formed by allocating the subcarriers respectively perform the inverse fast Fourier transform, to transform the frequency domain signal to the time domain signal.

When the subcarriers are allocated, the signal fills the desired bandwidths, and 0 fills other bandwidths. The subcarriers may be also allocated such that a subcarrier used by an antenna may not be used by another antenna.

Not only the multiple bandwidths and antennas but also a single bandwidth and a single antenna may be also used in steps S100 and S130.

When the single bandwidth and antenna are used, the data modulation process corresponds to that of the conventional IEEE 802.11a.

Accordingly, it is determined whether the OFDM signal is to be transmitted according to the MIMO transmit method using the multiple bandwidths and antennas in step S150. The information for determining the MIMO state is determined by searching the configuration and previous operation of the transmitter.

When the OFDM signal is to be transmitted according to the MIMO transmit method using the multiple antennas, the preambles for the respective subcarriers are generated in step S160. The preamble includes the long preamble of the operational antennas and subcarriers. The long preamble includes the first long preamble for the channel estimation of the operational subcarriers of the antenna and the second long preamble for the channel estimation of the subcarriers which are not used.

At this time, the first long preamble which has been used for a subcarrier by an antenna may be used for the second long preamble.

The signal symbol having information on the data demodulation is generated in step S161. The signal symbol is generated by mapping the information on the transmit mode, the data rate, the mapping method, and the code rate on the bits R1 to R4 and the antenna bit as shown in Table 1.

The data field and the frame for the MIMO antenna are generated by using the generated short preamble, the first long preamble, and the second long preamble in step S162. The frame is configured in an order of the short preamble, the first long preamble, the signal symbol, the second long preamble, and the data field.

When it is determined that the OFDM signal is not to be transmitted according to the MIMO transmit method, the frame for the single antenna is generated in step S170 in a like manner of the conventional system. The frame for the single antenna also includes a short preamble, a long preamble, a signal symbol, and a data field. A description of the generation of the frame for the single antenna which has been described above will be omitted.

The frame generated by the above configuration is transmitted to the receiver through the RF transmit unit in step S180.

Figure 9:
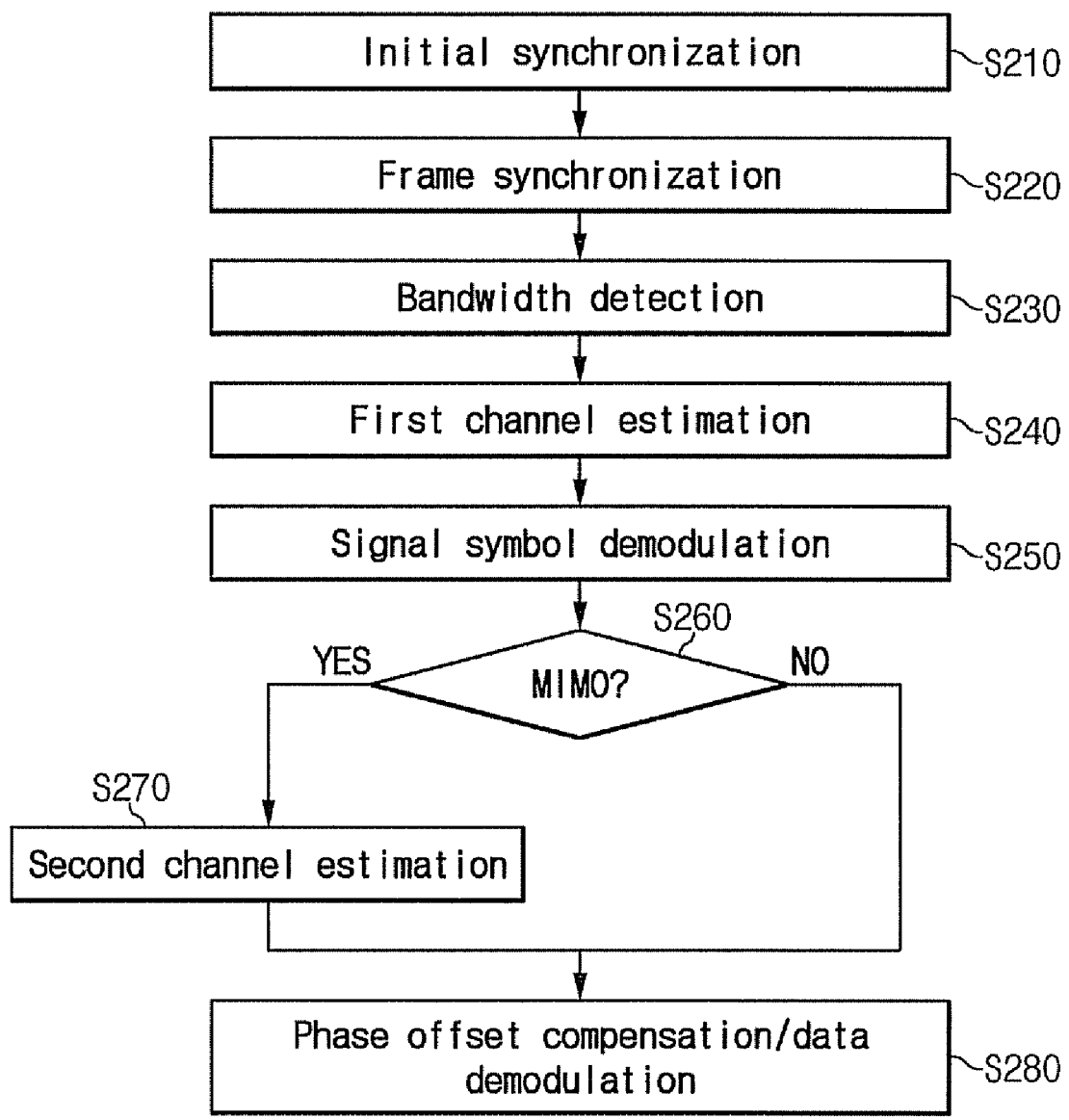
FIG. 9 shows a flow chart for representing a method for receiving the data according to an exemplary embodiment of the present invention.

FIG. 9 shows a flowchart for representing a method for receiving the data according to an exemplary embodiment of the present invention.

In the method for receiving the data, the OFDM signal received through the radio channel is initially synchronized in step S210. In addition, the DC offset is eliminated by using a filter, and the I/Q discordance is compensated in step S210. The short preamble and the first long preamble before the signal symbol are used to perform the initial synchronization of the compensated signal.

The subcarrier frequency offset is estimated by using the auto-correlation of the short preamble and the first long preamble, and the frame synchronization is performed by using the cross-correlation of the short preamble and the first long preamble in step S220.

The bandwidth detection is performed for determining the operational bandwidth by using the auto correlation of the first long preamble in step S230.

A first channel estimation is performed by the fast Fourier transform of the first long preamble in step S240. Methods for the initial timing synchronization, frequency synchronization, and channel estimation are easily selected by those skilled in the art because a physical layer convergence procedure (PLCP) preamble which is a train signal for the synchronization has been defined in the IEEE 802.11a.

The receiver demodulates the signal symbol and determines the information on the signal symbol in step S250. The signal symbol includes information on transmit mode, data rate, mapping method, and code rate.

The receiver determines whether the demodulated signal symbol is transmitted from the MIMO system with reference to the transmit mode information in step S260. The transmit mode information is given based on an establishment value of the R4 bit among the signal symbols.

When the transmit mode is the MIMO-OFDM mode, the channel estimation is performed by using the second long preamble transmitted after the signal symbol. The first long preamble of a subcarrier which is not used by another antenna is substituted for the second long preamble. Accordingly, the channel estimation on the MIMO-OFDM signal is finished when the second estimation is performed S270.

The phase offset is compensated by using the pilot subcarrier, and the data demodulation is performed according to the data rate, mapping method, and code rate in the signal symbol S280. The data demodulation has been described with reference to FIG. 3.

When the transmit mode is not the MIMO-OFDM mode in the previous step S260, the phase compensation and the data demodulation are performed without performing another channel estimation.

According to the exemplary embodiment of the present invention, the high-speed data rate is provided by the MIMO-OFDM system, and the compatibility with the conventional system is also provided because most of the frame configuration of the conventional single antenna OFDM system is maintained in the exemplary embodiment of the present invention.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for a transmitter having multiple antennas to generate a frame for transmitting data for a wireless communication system, the method comprising:
generating a short preamble including synchronization information by a frame generator;
generating two or more long preambles positioned subsequent to the short preamble by a frame generator;
generating a data symbol positioned subsequent to the long preambles by a frame generator, wherein the data are divided and inputted into two or more, and encoded by multiple convolution encoders,
generating a signal symbol positioned between a first long preamble and a second long preamble by a frame generator, the signal symbol includes information about coding rate, modulation, and space time block coding,
wherein the two or more long preambles include channel estimation information that is necessary for a receiver to demodulate the data symbol.

2. The method of claim 1, wherein the number of two or more long preambles is determined by the number of data streams that are transmitted to transmitting antennas.

3. The method of claim 1, wherein the two or more long preambles are generated by using a basic long preamble.

4. The method of claim 1,
wherein the number of transmitting antennas is two, and the transmitting antennas include a first antenna and a second antenna, and
wherein generating each of the two or more long preambles comprises:
generating the first long preamble of the first antenna with even subcarriers of the basic long preamble;
generating the second long preamble of the first antenna with odd subcarriers of the basic long preamble;
generating the first long preamble of the second antenna with odd subcarriers of the basic long preamble; and
generating the second long preamble of the second antenna with even subcarriers of the basic long preamble.

5. The method of claim 4, further comprising:
dividing source data into a plurality of bands;
performing an error correction coding with the divided source data to generate coded data;
interleaving the coded data to generate interleaved data;
mapping the interleaved data to complex symbols;
dividing the complex symbols to the transmitting antennas; and
allocating subcarriers to the complex symbols and performing inverse Fourier transformation for every transmitting antenna to generate the data symbol.

6. The method of claim 5, wherein dividing the complex symbols comprises:
performing space time block coding with the complex symbols to divide to the transmitting antennas.

7. An apparatus, comprising:
a frame generator to generate a frame, the frame comprises a short preamble, two or more long preambles positioned subsequent to the short preamble, data symbol positioned subsequent to long preambles, and a signal symbol positioned between a first long preamble and a second long preamble, the signal symbol includes information about coding rate, modulation, and space time block coding; and
a transmitter to transmit the frame via at least one an antennas,
wherein the two or more long preambles include channel estimation information that is necessary for a receiver to demodulate the data symbol, and
the data are divided and inputted into two or more, and encoded by a multiple encoders.

8. The apparatus of claim 7, wherein the number of the two or more long preamble is determined by the number of data streams that are transmitted to antennas.

9. The apparatus of claim 7, wherein the two or more long preambles are generated by using a basic long preamble.

* * * * *